Figure 3:
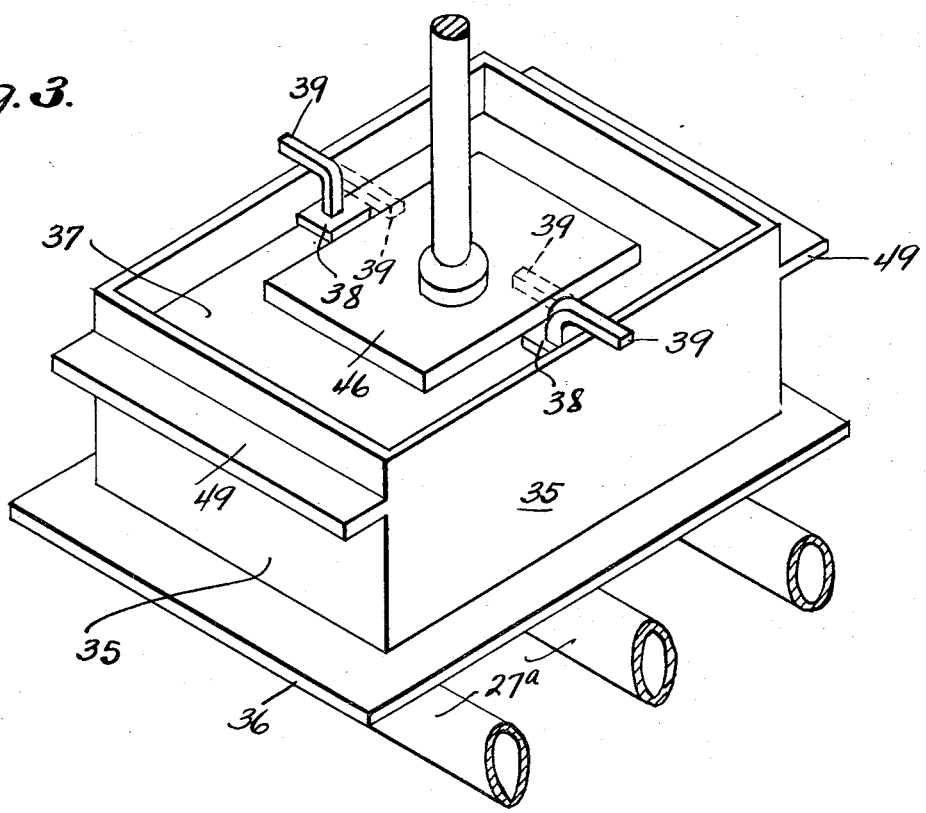

Dec. 22, 1942.  E. H. HAUX  2,306,310
METHOD OF MAKING CELLULAR GLASS BLOCKS
Filed May 1, 1941   5 Sheets-Sheet 1
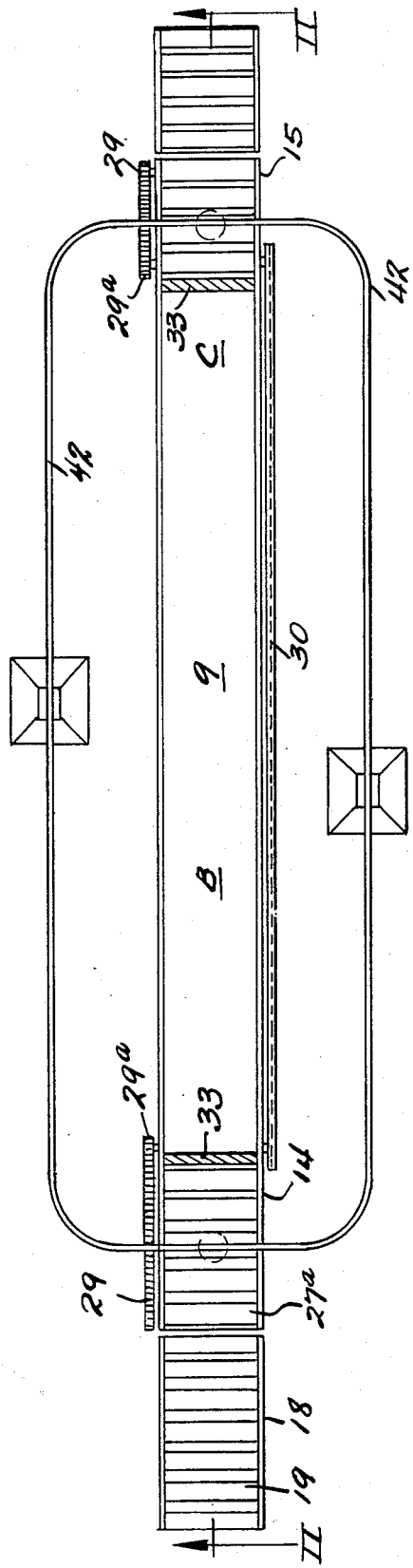
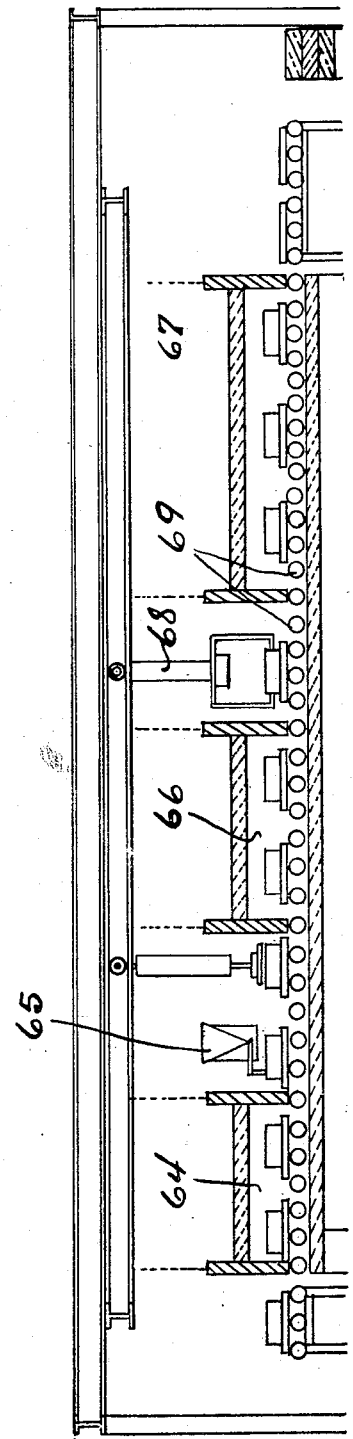
INVENTOR
ELMER H. HAUX
BY Olen E. Bee
ATTORNEY.

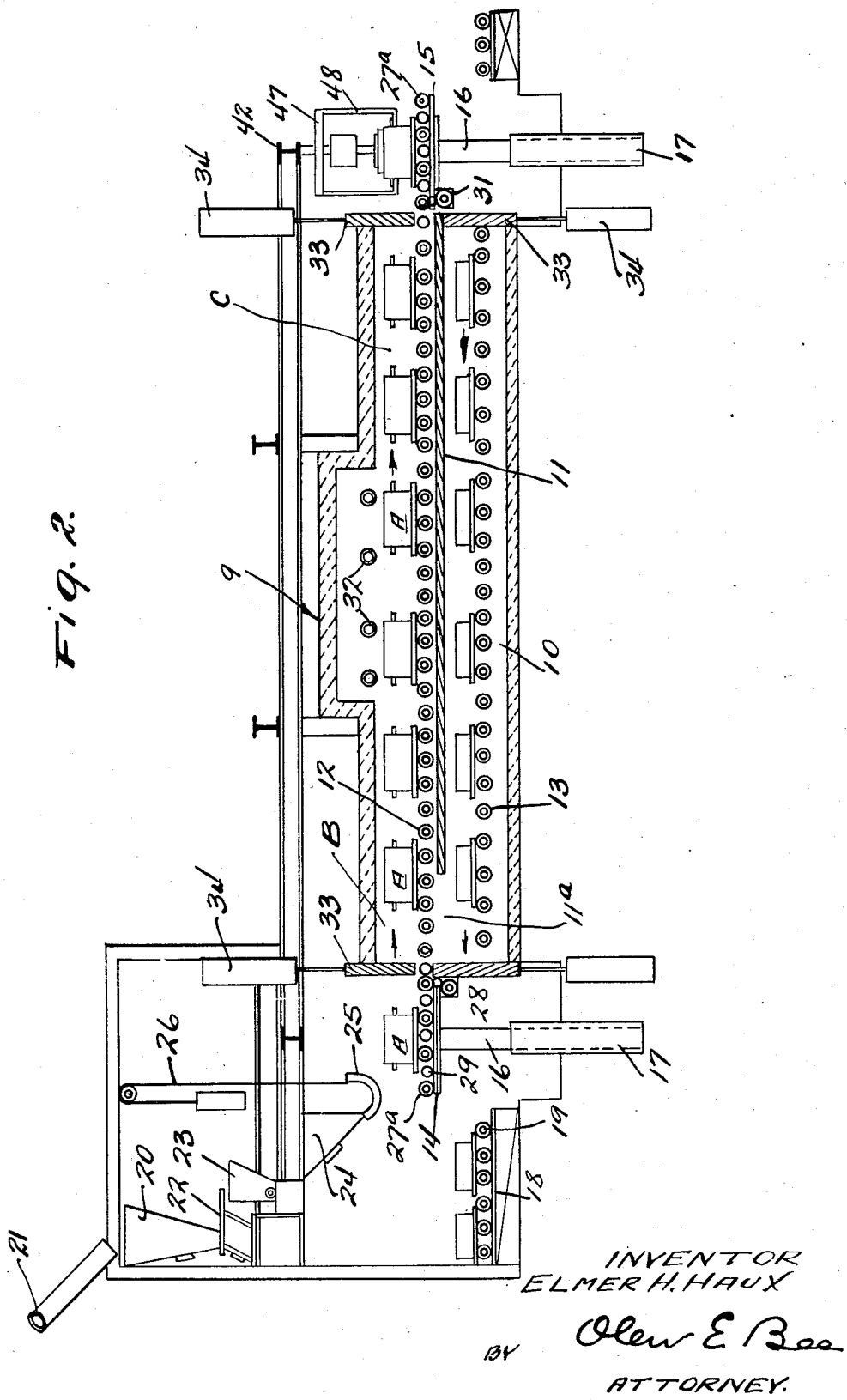

Dec. 22, 1942.     E. H. HAUX     2,306,310
METHOD OF MAKING CELLULAR GLASS BLOCKS
Filed May 1, 1941     5 Sheets-Sheet 3

INVENTOR
ELMER H. HAUX

BY Olew E Bee
ATTORNEY.

Dec. 22, 1942.   E. H. HAUX   2,306,310
METHOD OF MAKING CELLULAR GLASS BLOCKS
Filed May 1, 1941   5 Sheets-Sheet 5

INVENTOR
ELMER H. HAUX

BY Olen E. Bee
ATTORNEY.

Patented Dec. 22, 1942

2,306,310

UNITED STATES PATENT OFFICE 2,306,310

METHOD OF MAKING CELLULAR GLASS BLOCKS

Elmer H. Haux, Detroit, Mich., assignor to Pittsburgh Plate Glass Company, Allegheny County, Pa., a corporation of Pennsylvania Application May 1, 1941, Serial No. 391,274

1 Claim. (Cl. 49—85)

The invention relates to a method for making cellular glass blocks. In the production of cellular glass, as set forth in my application, Serial No. 171,911, filed October 30, 1937, powdered glass is mixed with a powdered gassing material, such as calcium carbonate, which decomposes above the sintering temperature of the glass with the evolution of gas, and upon the application of the necessary heat, the gas entrapped in the softened glass expands producing a cellular mass. When this operation is carried on in a mold and the content is suitably solidified and annealed, a block is produced of low apparent density due to its cellular composition and well suited for insulation in building construction. The present invention has to do with the production of blocks of the character specified in a cheap, efficient manner suitable for a commercial operation.

Briefly stated, the apparatus comprises a tunnel kiln through which the molds containing the mixture of glass and gassing material are carried so as to secure in transit the necessary heating, cooling and annealing, the molds being of knock-down form to permit the removal of the blocks, which have a tendency to stick in the molds.

As the blocks are often of considerable thickness, a long cooling and annealing period is required and one of the objects of the invention is the provision of a method whereby this period may be reduced to a minimum.

A difficulty encountered in the production of the blocks in molds is the tendency of the upper surfaces of the blocks to form a crust which cracks open when the material expands. One object of the present invention is to overcome this difficulty, and this is accomplished, as more fully described later, by the use of a top plate fitting into the mold and free to move vertically when engaged by the top surface of the expanding mass of glass, such plate permitting the expansion of the glass, while serving to prevent the crust formation and subsequent cracking besides insuring a flat surface at the top of the block.

When metal molds of heat resisting composition are employed, difficulty is encountered after the glass has solidified due to the high coefficient of expansion of the metal as compared with that of the glass which tends to crack the blocks. A further object of the invention is to overcome this difficulty. This is accomplished by providing a section in the tunnel kiln immediately following the heating section which is open to the atmosphere and at which point the sides and cover plates of the molds are removed before the glass has dropped in temperature much beyond the solidification point. This avoids breakage in the subsequent cooling of the blocks to a point only slightly above the upper limit of the critical annealing range. The blocks on their bottom plates are then carried through the annealing section of the kiln where cooling occurs gradually through the critical annealing range (about 1050 to 950 deg. F.). This open air exposure before annealing is of value in reducing the time of the operation even though the molds are of the nonmetallic type (fused silica) which have low expansion and therefore, would not have to be removed from the blocks as in the case of the metal molds.

Figure 5:
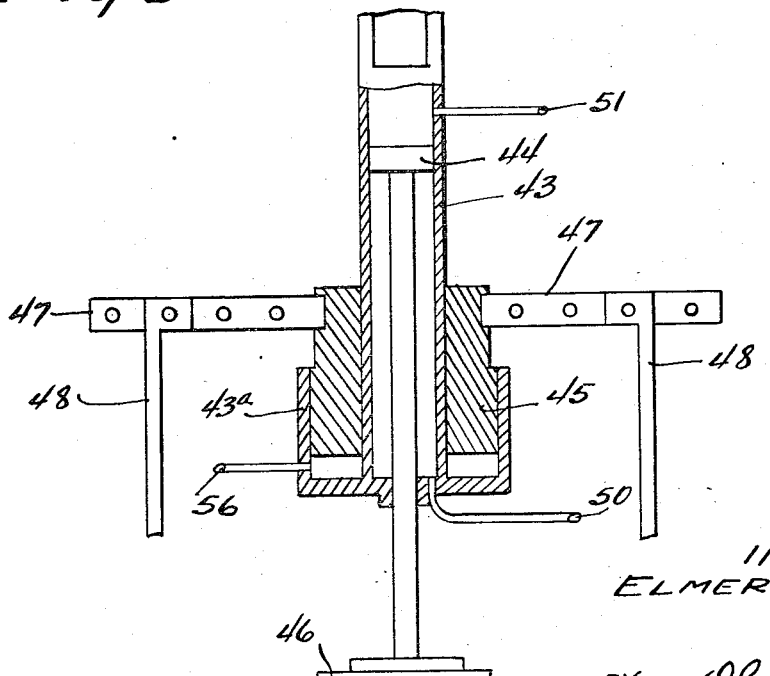
Figure 4:
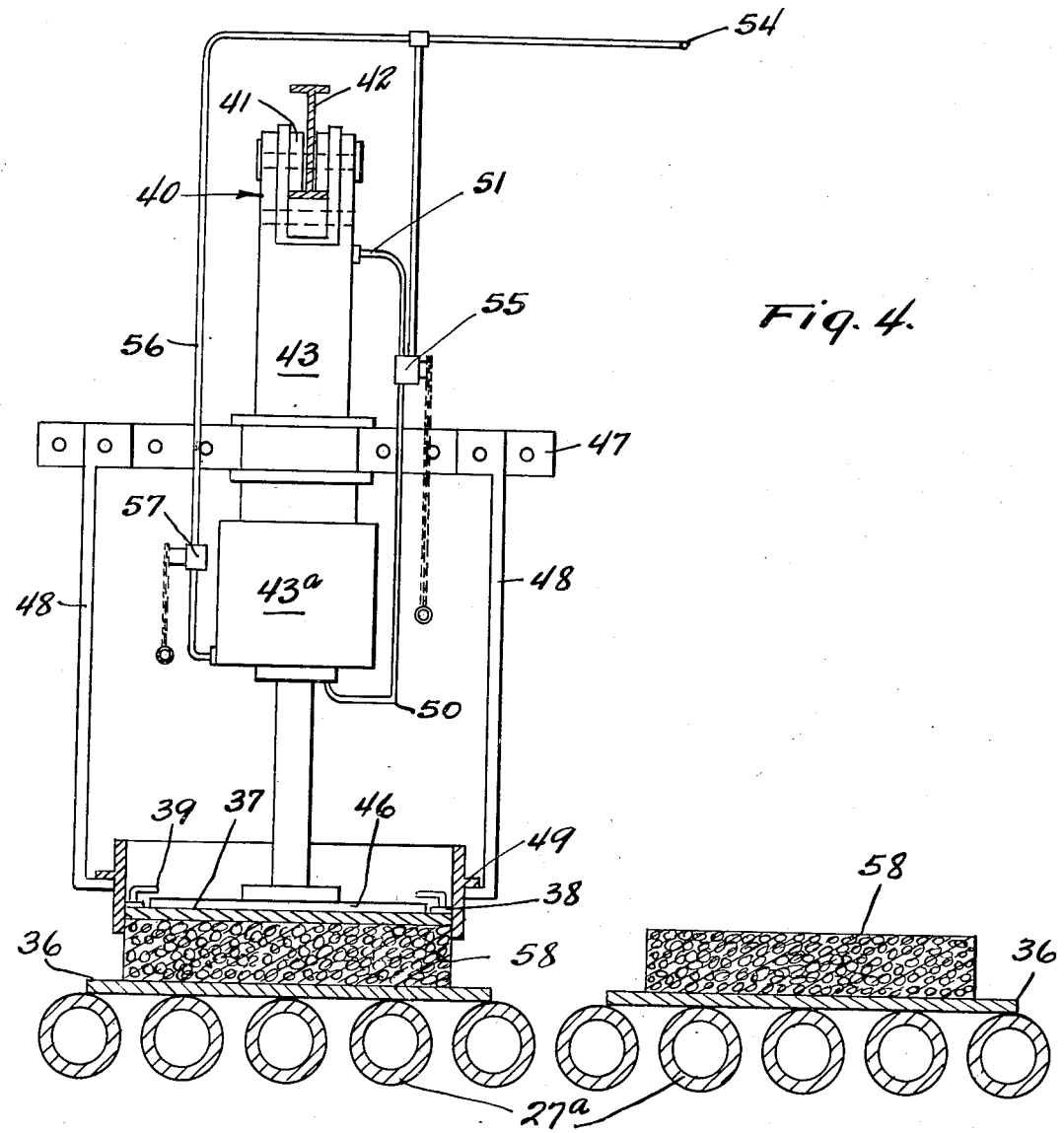
Figure 7:
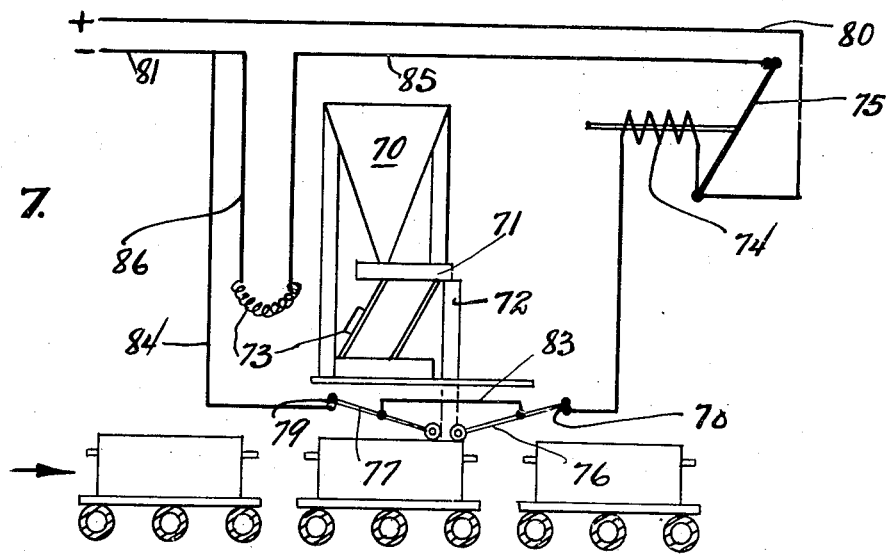
Figure 8:
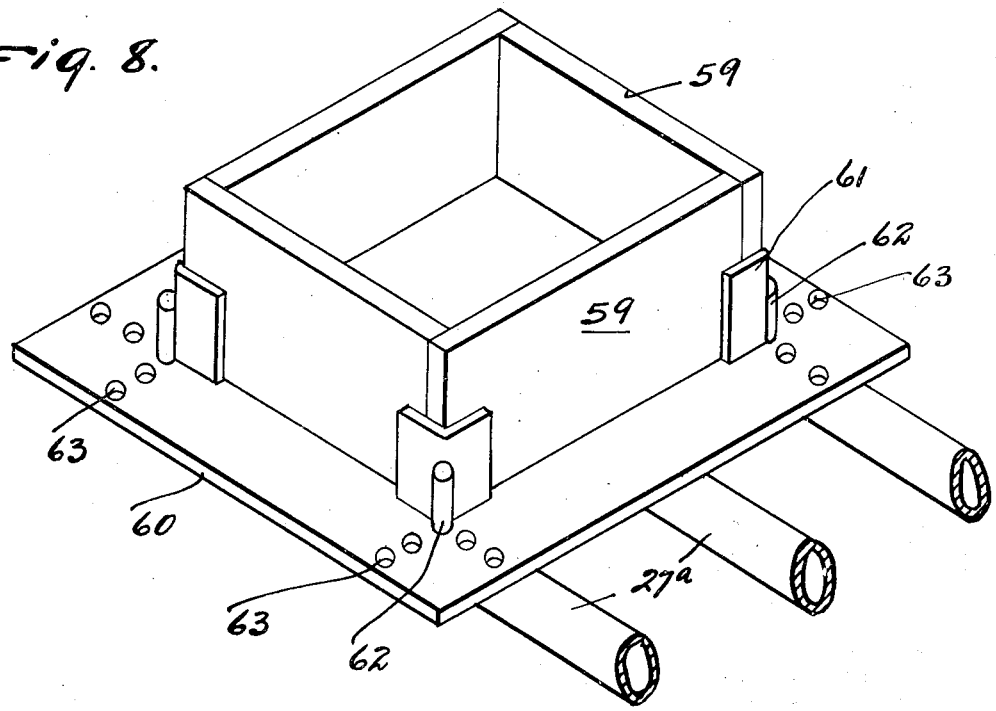

Certain embodiments of the apparatus employed are illustrated in the accompanying drawings, wherein:

Figure 1 is a plan view of one form of the apparatus; Fig. 2 is a section on the line II—II of Fig. 1; Fig. 3 is a perspective view of one form of the mold employed and certain cooperating parts; Fig. 4 is an enlarged side elevation partially in section of the apparatus for removing the molds from the blocks after they have solidified; Fig. 5 is a partial vertical section through the Fig. 4 construction; Fig. 6 is a vertical section through a modified construction; Fig. 7 is a side elevation of an automatic feeder control employed with the apparatus of Fig. 6; and Fig. 8 is a perspective view of a modified mold construction.

Referring to the general arrangement of the apparatus as shown in Figs. 1 and 2 of the drawings, the tunnel kiln here employed for handling the molds is made in two sections 9 and 10 arranged one above the other with an interposed wall 11. The molds A are carried through the kiln sections by means of the roller runways comprising the sets of suitably cooled rolls 12 and 13 driven as later described, so that molds in the upper section 9 are moved from the left hand end of the kiln to the right hand end, and those in the lower section are moved from the right hand end to the left hand end, which movements are indicated by the arrows in Fig. 2. Transfer tables 14 and 15 are provided at each end of the kiln, such tables being carried upon plungers 16 working in the hydraulic cylinders 17. The molds are filled at the left hand end of the kiln while positioned on the table 14, as shown, and are then carried through the section 9 of the kiln to the table 15. Here the cover plates and sides of the molds are stripped from the blocks and the table 15 is lowered so that its runway is in line with the runway of the lower leer section, after which the blocks which have been formed in the molds are carried to the left through the section 10 supported upon the bottom plates. Arriving at the left hand end of the kiln, these blocks pass onto the table 14, which is now in lowered position and run thereover onto the receiving table 18 which is provided with rollers 19 forming a runway.

The mixture of powdered glass and gassing material, such as calcium carbonate is fed to the molds while supported on the table 14, as indicated in Fig. 2. The feeder includes the hopper 20, to which the mixed bath is supplied from the chute 21. This hopper 20 is preferably provided with a vibrating feeder 22, which delivers the material into a tilting weigh hopper 23, just sufficient material being supplied to this hopper to charge one of the molds. The weigh hopper discharges into a third hopper 24, which is also provided with a vibrator and discharges through the flexible pipe 25 to the mold, such flexible pipe being held in inoperative position by means of the cable 26 provided with the weight 27 arranged as shown.

The table 14 is provided with a roller runway comprising the rolls 27a driven through suitable reduction gearing from the electric motor 28 carried upon the table. The rolls are provided with spur gears upon their ends which mesh with idlers 29 so that the drive of one roll from the right hand end of the table gives the proper rotation to all of the rolls. The rolls 12 of the kiln section 9 are also driven from the motor 28 when the table is in its upper position, as shown. At this time, a gear on the end roll of the set 27a driven from the motor 28 engages an idler meshing with a spur gear 28a (Fig. 1) on the end roll of the series of rolls 12. The other end of this roll is provided with a sprocket, and a chain 30 passing around this sprocket and over similar sprockets on the ends of the rolls 12 provides a drive for all of the rolls to secure the movement of the molds through the kiln section. When the table 14 is in its lower position, it is arranged, as above described, to drive the rolls 13 of the lower kiln section 10. The table 15 at the right hand end of the kiln sections has a driving means including a motor 31 similar to that described in connection with the table 14. When this table is in upper position, this motor drives all of the rolls of the upper kiln section 9, and when in lower position, it drives all of the rolls of the lower kiln section. Provision is thus made for driving the transfer rolls in the kiln sections from each end, and the motors are of the reversing type, so that when the tables are in lower position, the reversed drive thereof rotates the rolls so as to carry the blocks in the lower section to the left. It will be understood in this connection that any suitable means might be employed for driving the rolls on the transfer tables and the rolls in the kiln sections so as to give the proper movement of the molds and blocks through the sections.

The heating section 9 of the kiln is provided at its central portion with a series of gas burners 32 which bring the temperature of this portion of the kiln up to 1500 to 1750 deg. F., depending upon the character of the charge in the molds; and the length of the heating operation in order to sinter the mass in the mold and permit it to expand into a cellular mass, as heretofore described, will range from one to three hours depending upon the character of the charge and the size of the articles produced. The portions B and C of the heating section of the kiln are at a lower temperature than the central portion which is provided with the burners, so that a soaking action occurs in the portion B and a cooling action in the portion C. The movement through this heating section of the leer is preferably an intermittent one, as otherwise, the section would have to be made of much greater length. Such movement may be obtained by alternately starting and stopping rollers 12, by appropriate control of the power, e. g., by turning the current on or off from the actuating motors. The material in the molds, while in the hot central portion of the heating section, is brought to a semi-fused, dough-like consistency which is necessary in order to give the desired cellular structure. In the section C, the mass in the mold cools sufficiently to form a solid block, but the block is still at a temperature not greatly below the softening point of glass when the molds are run out onto the table 15. In order to avoid heat losses and maintain the kiln sections at proper temperature, suitable doors 33 are provided at each end of each section, such doors being operated from the air cylinders 34.

The molds have a tendency to stick to the glass blocks formed therein, and in order to reduce sticking to a minimum, the interior of the mold is coated with sand, chalk or the like, the use of sand being preferred. Such sand is applied mixed with water by spraying or painting and allowed to dry. When a metal bottom plate is employed in a mold, it is desirable to have a coating of sand or similar refractory material of substantial thickness (preferably about one-fourth inch) in order to prevent localized heating and blistering which will otherwise occur. Fig. 3 illustrates a mold of the metal type consisting of the four side walls 35 of heat resisting steel welded together at their meeting ends, the bottom plate 36 of cast iron and the cover plate 37 preferably of the same composition as the sides. The mold rests upon a suitable support, such as conveyor rollers 13. A suitable heat resisting composition for the sides and cover plate consists of a composition of 22 to 26 percent of chromium, 11 to 13 percent of nickel, and the balance iron. The cover plate has welded to its upper sides a pair of lugs 38 carrying latch members 39 journaled therein. Members 39 when positioned, as indicated in full lines in Fig. 3, support the cover plate at a position well above the mixture of powdered glass and gassing material in the mold. When these latches are turned through the angle of 180 degrees, as indicated in dotted lines, they act as a means whereby the cover plate may be lifted from the mold when such mold is stripped from the block, as later described. The cover plate when supported upon the members 39 is free to move upwardly with respect to the sides of the mold. It is spaced above the mixture in the mold at such a distance that when the mass becomes viscous and expands to approximately the predetermined thickness of the block to be produced, it engages the plate, which thus presses yieldingly upon the upper surface of the mass by virtue of its weight. The plate might be weighted to give some additional pressure, but a cover plate of about ¾ inch in thickness provides about the right amount of pressure upon the mass of material in the mold. The use of this cover plate is important. Without such cover plate, the top surface of the mass of glass bulges and becomes crusted over in such manner that cracks occur. The use of the cover plates prevents this crusting over and flattens out the top surface of the block, so that no finishing operation is required upon such surface. It is possible to operate without the use of the members 39 holding the cover plate spaced away from the mixture in the mold and allow the plate to rest directly upon the mixture from the beginning and rise therewith as it expands. Difficulty is encountered, however, under these conditions, due to the tendency of the cover plate to tilt and wedge. It also has a tendency to lie at an angle to the horizontal, after it has completed its upward movement, even though it does not wedge during such movement.

In the practice of the invention, glass, slag or other vitreous material is crushed so that it will pass a screen of about 28 to 100 or even 200 mesh per inch. It is then admixed with a gassing agent such as precipitated $CaCO_3$, in an amount of about ½ to 3 percent or a small amount of carbon black. The mixture is then charged into a mold in such amount that when it is cohered and cellulated it will fill the mold to the desired degree. Usually the mass, after it is sintered and the gassing agent has decomposed, will occupy about 3 to 7 times its original volume. The expansion can be controled at will by control of the amount of gassing agent employed. The cover is suspended above the charge by ears 18.

The mold is run into a furnace such as that shown in my copending case and is there heated to a temperature sufficient first to sinter the glass particles into a coherent whole and then to liberate the gas from the gassing agent, thus cellulating or bloating the mass. The temperature should be sufficient to form a pasty or doughlike mass that will rise like bread, but it should not be sufficient to produce an overly fluid mass through which the bubbles of gas will rise and burst. A temperature of about 1500 to 1750° usually is best for most grades of glass.

The mass in rising first expands freely but later engages cover 12, which is then carried upwardly. The slight pressure maintains uniformity of the upper surface and prevents the formation of any cracks.

The cellulated but pasty or doughy mass is removed from the furnace and cooled and annealed. The mold may be removed at an appropriate stage after the mass has hardened sufficiently.

The table 15 at the right hand end of the kiln sections constitutes a cooling station for giving a rapid drop in temperature in the block intermediate its transfer from the heating section 9 to the annealing section 10. This rapid cooling in the open air is desirable, as it cuts down the time which the mold and block would otherwise have to remain in the kiln. The block and mold may have a temperature as high as 1450° F. when taken onto the table 15. While on such table, the sides and top plate of the mold are removed, so that it is exposed to cooling on the bottom plate 36. Under these conditions, a very rapid cooling occurs before the block on its plate is transferred to the annealing section 10. This drop in temperature may be to any point above the upper limit of the critical annealing range, such upper limit being about 1050° F. As long as the drop in temperature in the open is not below this point, no damaging to the block occurs. The temperature in the annealing section 11 covers the critical annealing range from 1050° F. or slightly above to a point below 950° F. As the blocks are carried through the annealing section from right to left, they drop through this range gradually and arrive at the left hand end of the kiln at a temperature suitable for removal on the table 14. The placing of the two sections one above the other gives a compact arrangement and reduces heat losses. An opening 11a (Fig. 2) in the wall 11 permits of a heat transfer from the upper to the lower section.

The apparatus for stripping the molds from the blocks will be seen by reference to Figs. 4 and 5. A carrier 40 provided with the wheels 41 is mounted on an overhead monorail 42 which extends transversely of the table 15. This support includes a pair of cylinders 43, 43a, in which are mounted the plungers 44 and 45. The plunger 44 carries a plate 46 at its lower end which is adapted to engage the top plate 37 of the mold and hold the plate down while the sides 35 are being stripped upward. The plunger 45 carries a transverse arm 47 provided with depending hooks 48 which are adapted to hook under the brackets 49 secured to the mold sides. Air is supplied to the two ends of the cylinder 43 by means of the connections 50 and 51 leading to the air supply pipe 54 and controlled by a four-way valve 55. Air is supplied and released from the cylinder 43a by the connection 56 provided with the three-way valve 57. In operation the stripping device is applied to the mold, as indicated in Fig. 4 and air is admitted above the plunger 44 and below the plunger 45, the latch members 39 being at this time turned to their dotted line positions (Fig. 3). The block 58 is thus held down against its bottom plate by the plate 46 and at the same time the hooks 48 are moved upward by the plunger 45, thus stripping the sides of the mold from the block. With the members 39 turned to their dotted line position, as indicated in Fig. 3, both the sides of the mold and the top plate are now carried upon the trolley device on the mono-rail 42. This mono-rail 42 leads back to the entrance end of the kiln, as indicated in Fig. 1, so that a convenient means is thus provided for transporting the mold parts back to the entrance end of the leer for reuse.

Fig. 8 illustrates a different type of mold which may be used in place of the metal mold heretofore described. The parts of this mold are preferably made of fused silica mixed with an aluminous cement. This gives a composition which is relatively strong and which has a very low coefficient of expansion. In this construction, the four side walls 59 are separate from each other and rest removably upon the bottom plate 60 of fused silica. The bottom plate and side walls are held in assembled relation by means of corner brackets 61 having pins 62 adapted to engage perforations 63 in the bottom plate, thus providing adjustment for supporting side walls of different dimensions upon the same bottom plate. As in the other type of construction, a cover plate, in this case fused silica composition, is employed, such plate resting on the side walls 59 and free to move vertically. This type of mold has less tendency to stick to the glass block an involves no requirement for stripping the mold from the block after the block has solidified. The silica composition has a slightly lower coefficient of expansion than the glass, so that the block may be completely cooled down in the mold without injury to the mold or to the block itself. However, if desired, and in order to speed up the operation, the sides and cover plate of the mold may be removed, as heretofore described, in an open section of the kiln, in order to provide more rapid cooling and annealing.

Fig. 6 illustrates a modified kiln arrangement, in which the heating and annealing sections are all on the same level, instead of being on two levels as in the construction of Figs. 1 and 2. In this construction, 64 is a section in which the molds are preheated preliminary to filling; 65 is a feed device for filling the molds; 66 is the heating section, in which the same function is accomplished as in the section 9 of the first construction; and 67 is an annealing section. Between the heating and annealing section is an open air station, as in the first construction, such station being utilized for stripping the molds by the use of a mechanism 68, such as that shown in Fig. 4. The operation is in substance the same as that heretofore described, the molds being moved upon the roller runway 69 in an intermittent manner, so as to permit the use of a shorter kiln than would otherwise be required. The open air station is not only utilized to strip the molds, but permits of quick cooling preliminary to annealing, thus shortening the time period required, as heretofore pointed out in connection with the first type of construction.

Fig. 7 illustrates an automatic feeder which may be used with the type of construction shown in Fig. 6, wherein the molds are carried one after the other beneath the feeding device. This feeding device comprises the hopper 70 and a table 71 which is vibrated electrically to feed a mixture of the glass and gassing material downward through the chute 72. Automatic means are provided for stopping the vibration of the chute during the period in which the molds are not in proper position beneath the line of feed from the chute. The means for doing this will be apparent from the wiring diagram, wherein 73 is the coil of the vibrator and 74 is a relay coil which operates the switch 75. The molds are arranged so that they engage the rollers on the ends of the switch arms 76 and 77, which make and break contact at 78 and 79. When the mold is out of contact with the roller on either of these arms, the circuit is broken in such manner that the vibrator operated by the coil 73 ceases to function. This will be apparent from a consideration of the diagram of Fig. 7, assuming that the molds are moving from left to right, as indicated by the arrow. The contacts at 78 and 79 are now closed and current flows from the lead 80 to the lead 81 through the coil 74 via the connections 82, 83 and 84. This causes a closing of the switch arm 75, so that current flow occurs through the coil 73 via the lead 80, arm 75, wire 85 and wire 86. The machine, therefore, feeds until the roller on the arm 77 passes off of the left hand end of the mold, breaking the contact at 79 and interrupting the circuit through the coil 74 so that the switch opens and he circuit through the coil 73 is interrupted. When the roll on the arm 76 passes off of a mold, the contact at 78 is also broken. It is now necessary to make both of these contacts at 79 and 78 before the feed will start again, and this will not occur until the next mold moves the arms 76 and 77 to operative position again, as shown in Fig. 7.

This is a continuation in part of application No. 187,456, filed by me January 28, 1938, for Apparatus for making cellular glass blocks. That application matured into Patent No. 2,257,681, dated September 30, 1941.

What I claim is:

A method of making a cellular glass block which consists in placing a mixture of powdered glass and gassing material in a mold opening upwardly, supporting a flat cover plate within the mold for free upward movement at a predetermined distance above said mixture, heating the mold until the mixture sinters and expands forming a cellular mass whose upper surface is yieldingly engaged by the cover plate and flattened thereby as the surface approaches its upward limit of movement, cooling the mold until the mass therein sets into a hardened cellular block, and then annealing the block.

ELMER H. HAUX.